United States Patent Office 2,777,864
Patented Jan. 15, 1957

2,777,864

16-OXY-CORTISONE, 16-OXY-HYDROCORTISONE AND PROCESS

Seymour Bernstein and William S. Allen, Pearl River, N. Y., assignors to American Cyanamid Company, New York, N. Y., a corporation of Maine No Drawing. Application July 19, 1954, Serial No. 444,348

13 Claims. (Cl. 260—397.45)

This invention relates to new pregnenes. More particularly, it relates to $\Delta^4$-pregnenes and methods of preparing the same.

The discovery of the highly desirable activity of cortisone in the treatment of rheumatic diseases and other pathological conditions is now well known. While cortisone and related compounds, such as hydrocortisone, are highly active, they produce certain side reactions which are distinctly undesirable and which limit a wider use of such compounds, except under careful observation. It is also well known that compounds, such as cortisone, when administered to adrenalectomized or adrenalectomized-gonadectomized animals causes distinct involution in the thymus. This affect has been adapted for a bioassay in determining the activity of adrenocortical hormones. Compounds of the present invention such as 16α-hydroxyhydrocortisone in this assay exhibit activities similar to cortisone and hydrocortisone. Karnofsky et al. (Endocrinology 48, page 596 (1951) has shown that cortisone and hydrocortisone will inhibit the development of chick embryos in a charateristic manner. Compounds of the present invention such as 16α-hydroxyhydrocortisone ($\Delta^4$-pregnene-11β,16α,17α,21-tetrol-3,20-dione) when injected into chick embryos produces inhibition several times greater than cortisone or hydrocortisone.

The compounds of the present invention can be illustrated by the following general formula:

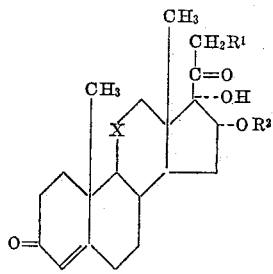

in which X is a divalent radical of the group consisting of —CH$_2$—;

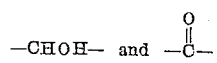

R$^1$ is a hydroxyl or acyloxy radical and R$^2$ is hydrogen or an acyl radical.

These compounds are soluble in organic solvents such as, for example, acetone or methanol and are relatively insoluble in petroleum ether. They have comparatively high melting points (usually above 200° C.).

The compounds of the present invention are prepared by reacting a $\Delta^{4,16}$-pregnadiene with osmium tetroxide in the presence of an organic solvent and an alkaline catalyst. The osmium tetroxide reaction involves the addition of hydroxyl groups in the α-configuration to the double bond in the 16,17-positions.

The intermediates used in the process of the present invention can be prepared by methods described in the chemical literature and the examples hereinafter. They can be, for example, compounds such as $\Delta^{4,16}$-pregnadiene-21-ol-3,20-dione 21-acetate; $\Delta^{4,16}$-pregnadiene-11β,21-diol-3,20-dione 21-acetate; $\Delta^{4,16}$-pregnadiene-21-ol-3,11,20-trione, and the like.

The present compounds can also be prepared by reacting a $\Delta^{5,16}$-pregnadiene in which the keto groups in the 3- and 20-positions are protected with cyclic ketal radicals, with osmium tetroxide in the presence of an organic solvent. The products obtained are the corresponding pregnene-16,17-diols cyclic ketals which on hydrolysis for removal of the cyclic ketal groups produce the compounds of the present invention.

In carrying out the present process the $\Delta^{4,16}$-pregnadiene is dissolved in a solvent such as benzene, xylene, toluene and the like. To this mixture is added an alkaline catalyst such as an organic base containing nitrogen, for example, pyridine, collidine, trimethylamine, etc., and the osmium tetroxide. The reaction mixture is allowed to stand from about 2 to 48 hours at a temperature of from 15° C. to 40° C. and the osmate ester then decomposed by the addition of water and an organic solvent under alkaline conditions. The desired product is extracted with a solvent such as chloroform, and after drying, it is evaporated to dryness and recrystallized to further purify.

The following examples describe in detail the preparation of $\Delta^4$-pregnenes of the present invention and are intended to be by way of illustration and not limitation.

Example 1

Cortisone 21-acetate bisethylene ketal (0.3 g.) was dissolved in 10 ml. of anhydrous pyridine, chilled to —5° and 2 ml. of thionyl chloride added. The mixture was allowed to stand at —5° C. for 16 hours and then poured into ice water. The oily mixture was extracted with 500 ml. of ether and the extract was washed with saturated sodium bicarbonate solution and finally 3 times with saturated saline solution. The extract was dried over anhydrous sodium sulfate and evaporated to dryness under reduced pressure. Crystallization of the oily residue from methanol yielded 130 mg. (45%) of $\Delta^{5,16}$-pregnadiene-21-ol-3,11,20-trione 21-acetate 3,20-bisethylene ketal, melting point 113°–114° C. Recrystallization from acetone-methanol raised the melting point to 114°–115° C., [α]$_D^{25}$ —13°; (chloroform).

Ultraviolet: $\lambda_{max}^{EtOH}$ none; infrared: $\lambda_{max}^{Nujol}$ 1744 cm.$^{-1}$ 1715 cm.$^{-1}$, 1680 cm.$^{-1}$, 1638 cm.$^{-1}$, 1246 cm.$^{-1}$, 1090 cm.$^{-1}$ $\Delta^{5,16}$-pregnadiene-21-ol-3,11,20-trione 21-acetate 3,20-bisethylene ketal (600 mg.) was refluxed for 20 hours with 800 mg. of sodium borohydride in 50 ml. of tetrahydrofuran containing 7 ml. of two and one-half percent sodium hydroxide solution. After the addition of water the tetrahydrofuran was evaporated under reduced pressure, and the residual aqueous solution was extracted with 500 ml. of chloroform. The extract was washed twice with saturated saline solution, dried over anhydrous sodium sulfate, and evaporated to dryness under reduced pressure. The gummy residue was crystallized from acetone-petroleum ether yielding 445 mg. (81%) of $\Delta^{5,16}$-pregnadiene-11β,21 - diol - 3,20 - dione 3,20-bisethylene ketal, melting point 187.5°–189° C. Recrystallization from acetone-petroleum ether raised the melting point to 189°–190° C., [α]$_D^{24}$ —33° (chloroform).

Ultraviolet: $\lambda_{max}^{EtOH}$ none; infrared: $\lambda_{max}^{Nujol}$
3500 cm.$^{-1}$, 1630 cm.$^{-1}$, 1098 cm.$^{-1}$ The $\Delta^{5,16}$-pregnadiene-11β,21-diol-3,20-dione 3,20-bisethylene ketal (250 mg.) was refluxed for one hour on a steam-bath with 4 ml. of 8% (v./v.) sulfuric acid in 40 ml. of methanol. After the addition of water, the methanol was evaporated off under reduced pressure and the aqueous solution was extracted with 500 ml. of chloroform. The extract was washed with saturated sodium bicarbonate solution, twice with saturated saline solution, and dried over anhydrous sodium sulfate. The extract was evaporated to dryness under reduced pressure, and the oily residue crystallized from acetone-ether to yield 100 mg. (50%), melting point 154°–156° C. Recrystallization from acetone-petroleum ether raised the melting point to 158°–160° C. The compound, $\Delta^{4,16}$-pregnadiene-11$\beta$,21-diol-3,20-dione, gave a positive $\alpha$-ketol test and a positive Porter-Silber test, $[\alpha]_D^{24}$ +200° (chloroform);

ultraviolet: $\lambda_{max}^{EtOH}$ 241–242 m$\mu$($\epsilon$22,600)

The $\Delta^{4,16}$-pregnadiene-11$\beta$,21-diol-3,20-dione (150 mg.) was allowed to stand overnight at room temperature with 5 ml. of pyridine and 2.5 ml. of acetic anhydride. The solvents were then evaporated off under reduced pressure, and the residue was crystallized with ether; the yield was 100 mg. (60%), melting point 144°–146° C. Recrystallization from acetone-petroleum ether-ether raised the melting point of the $\Delta^{4,16}$-pregnadiene-11$\beta$,21-diol-3,20-dione 21-acetate to 148°–149° C., $[\alpha]_D^{24}$ +191° chloroform);

ultraviolet: $\lambda_{max}^{EtOH}$ 240.5 m$\mu$($\epsilon$24,400)

The $\Delta^{4,16}$-pregnadiene-11$\beta$,21-diol-3,20-dione 21-acetate (0.70 g.) was dissolved in 25 ml. of benzene containing 0.7 ml. of pyridine, and 0.5 g. of osmium tetroxide added. The mixture was allowed to stand one day at room temperature, then the osmate ester was decomposed with 34 ml. of water, 20 ml. of benzene, 20 ml. of methanol, 3.6 g. of sodium sulfite and 3.6 g. of potassium bicarbonate. After stirring the mixture for eight hours, 100 ml. of chloroform was added, and the brown precipitate was filtered off and washed with 3 liters of hot chloroform. The combined chloroform extracts were washed twice with saturated saline solution and dried over anhydrous sodium sulfate. The extract was then evaporated to dryness under reduced pressure, and the residue crystallized from acetone-petroleum ether. The yield of $\Delta^4$-pregnene-11$\beta$,16$\alpha$,17$\alpha$,21-tetrol-3,20-dione was 304 mg. (44%), melting point 228°–230° C. Recrystallization from acetone-petroleum ether raised the melting point to 235°–238° C., $[\alpha]_D^{25}$ +119° (methanol);

ultraviolet: $\lambda_{max}^{EtOH}$ 241–242 m$\mu$($\epsilon$15,000)

infrared: $\lambda_{max}^{KBr}$ 3460 cm.$^{-1}$, 1734 cm.$^{-1}$, 1674 cm.$^{-1}$, 1633 cm.$^{-1}$, 1050 cm.$^{-1}$

Example 2

The $\Delta^{4,16}$-pregnadiene-11$\beta$,21-diol-3,20-dione (150 mg.) was allowed to stand overnight at room-temperature with 5 ml. of pyridine and 2.5 ml. of acetic anhydride. The solvents were then evaporated off under reduced pressure, and the residue crystallized with ether; the yield was 100 mg. (60%), melting point 144°–146° C. Recrystallization from acetone-petroleum ether-ether raised the melting point of the $\Delta^{4,16}$-pregnadiene-11$\beta$,21-diol-3,20-dione 21-acetate to 148°–149° C., $[\alpha]_D^{24}$ +191° (chloroform);

ultraviolet: $\lambda_{max}^{EtOH}$ 240.5 m$\mu$($\epsilon$24,400); infrared: $\lambda_{max}^{Nujol}$ 3544 cm.$^{-1}$, 1760 cm.$^{-1}$, 1680 cm.$^{-1}$, 1624 cm.$^{-1}$ 1592 cm.$^{-1}$, 1220 cm.$^{-1}$, 1072 cm.$^{-1}$ The $\Delta^{4,16}$-pregnadiene-11$\beta$,21-diol-3,20-dione 21-acetate (0.6 g.) was dissolved in 20 ml. of benzene containing 0.7 ml. of pyridine, and 0.5 g. of osmium tetroxide added. After standing at room-temperature for 3 days the osmate ester was discharged by the addition of 34 ml. of water, 20 ml. of benzene, 20 ml. of methanol, 3.6 g. of sodium sulfite and 3.6 g. of potassium bicarbonate. The mixture was stirred for 5 hours, 100 ml. of chloroform was added, and then stirred for one additional hour. The precipitate was filtered off, and washed with one and one-half liters of hot chloroform. The combined chloroform extracts were washed twice with saturated saline solution and dried over anhydrous sodium sulfate. The extract was evaporated to dryness under reduced pressure, and the residue was crystallized with acetone-petroleum ether. The yield of $\Delta^4$-pregnene-11$\beta$,16$\alpha$,17$\alpha$,21-tetrol-3,20-dione 21-acetate was 194 mg. (30%), melting point 211°–214° C. Recrystallization from acetone-petroleum ether did not alter the melting point; $[\alpha]_D^{24}$ +124° (chloroform);

ultraviolet: $\lambda_{max}^{EtOH}$ 241 m$\mu$($\epsilon$15,400); infrared: $\lambda_{max}^{KBr}$ 3510 cm.$^{-1}$, 1756 cm.$^{-1}$ (shoulder), 1734 cm.$^{-1}$ 1672 cm.$^{-1}$, 1628 cm.$^{-1}$ (shoulder), 1220 cm.$^{-1}$, 1064 cm.$^{-1}$

Example 3

The mother liquors from the crystallization of $\Delta^4$-pregnene-11$\beta$,16$\alpha$,17$\alpha$,21-tetrol-3,20-dione 21-acetate were evaporated to dryness under reduced pressure, and treated with a mixture of 5 ml. of pyridine and 2.5 ml. of acetic anhydride. The mixture was allowed to stand overnight at room temperature, then poured into cold water and extracted with 500 ml. of chloroform. The organic extract was washed twice with saturated saline solution, dried over anhydrous sodium sulfate, and evaporated to dryness under reduced pressure. Crystallization from acetone-petroleum ether-ether gave 18 mg. of $\Delta^4$-pregnene-11$\beta$,16$\alpha$,17$\alpha$,21-tetrol-3,20-dione 16,21-diacetate, melting point 219°–221° C., $[\alpha]_D^{24}$ +75° (chloroform);

ultraviolet: $\lambda_{max}^{EtOH}$ 240.5 m$\mu$($\epsilon$15,000); infrared: $\lambda_{max}^{KBr}$ 3546 cm.$^{-1}$, 1748 cm.$^{-1}$, 1732 cm.$^{-1}$ (shoulder)

1672 cm.$^{-1}$, 1626 cm.$^{-1}$, 1234 cm.$^{-1}$, 1055 cm.$^{-1}$

Example 4

A mixture of 840 mg. of $\Delta^{5,16}$-pregnadiene-11$\beta$,21-diol-3,20-dione 3,20-bisethylene ketal, 0.5 g. osmium tetroxide, 0.7 ml. of pyridine and 130 ml. of benzene was allowed to stand for 5 days at room temperature. The osmate ester was then discharged with a mixture of 30 ml. of water, 20 ml. of methanol, 3.10 g. of sodium sulfite and 3.10 g. of potassium bicarbonate. After stirring for 6 hours, the solution was decanted off and stirred overnight with an additional 3.10 g. of sodium sulfite and 3.10 g. of potassium bicarbonate. Two hundred ml. of chloroform was added, and the precipitate was filtered off and washed with 200 ml. of hot chloroform. The chloroform extract was washed 4 times with saturated saline solution, dried over sodium sulfate and evaporated to dryness under reduced pressure. Crystallization from acetone-petroleum ether yielded 554 mg. (61%) of $\Delta^5$-pregnene-11$\beta$,16$\alpha$,17$\alpha$,21-tetrol-3,20-dione 3,20-bisethylene ketal, melting point 239°–241° C. Recrystallization from acetone-petroleum ether changed the melting to 238.5°–239.5° C., $[\alpha]_D^{25}$ −24° (methanol);

ultraviolet: $\lambda_{max}^{EtOH}$ none; infrared: $\lambda_{max}^{KBr}$ 3512 cm.$^{-1}$, 3290 cm.$^{-1}$, 1100 cm.$^{-1}$, 1044 cm.$^{-1}$ In another run starting with 840 mg. of 16-dehydrocorticosterone bisketal the yield was 850 mg. (94%), melting point 230°–237° C.

The $\Delta^5$-pregnene-11$\beta$,16$\alpha$,17$\alpha$,21-tetrol-3,20-dione 3,20-bisethylene ketal (450 mg.) was dissolved in 40 ml. of methanol containing 4 ml. of 8% (v./v.) sulfuric acid and refluxed for 40 minutes. The mixture was cooled, neutralized with sodium bicarbonate solution, and the methanol was evaporated under reduced pressure. Crystals separated upon cooling, and then were filtered, washed with water and dried. The yield of $\Delta^4$-pregnene-11$\beta$,16$\alpha$,17$\alpha$,21-tetrol-3,20-dione was 200 mg. (55%), melting point 235°–239° C. Recrystallization from acetone raised the melting point to 236°–238° C., $[\alpha]_D^{25}$ +121° (methanol).

Example 5

The $\Delta^{5,16}$-pregnadiene-21-ol,3,11,20-trione 21- acetate 3,20-bisethylene ketal (500 mg.) was refluxed for one-half hour on a steam-bath with 20 ml. of two and one-half percent alcoholic potassium hydroxide. The addition of water yielded 357 mg. (79%) of $\Delta^{5,16}$-pregnadiene-21-ol-3,11,20-trione 3,20-bisethylene ketal, melting point 168°–170° C. Recrystallization from acetone-petroleum ether lowered the melting point to 157.5°–161° C., $[\alpha]_D^{25}$ −15° (chloroform);

ultraviolet: $\lambda_{max}^{EtOH}$ none; infrared: $\lambda_{max}^{Nujol}$ 3520 cm.$^{-1}$
3354 cm.$^{-1}$, 1710 cm.$^{-1}$, 1680 cm.$^{-1}$, 1630 cm.$^{-1}$, 1100 cm.$^{-1}$ The $\Delta^{5,16}$-pregnadiene-21-ol-3,11,20-trione 3,20-bisethylene ketal (1.7 g.) was refluxed for 40 minutes on a steam-bath with 10 ml. of 8% (v./v.) sulfuric acid in 100 ml. of methanol. The addition of water yielded 1.21 g. (87%) of $\Delta^{4,16}$-pregnadiene-21-ol-3,11,20-trione, melting point 231°–234° C. Recrystallization from acetone-ether lowered the melting point to 223°–238° C., $[\alpha]_D^{24}$ +236° (chloroform);

ultraviolet: $\lambda_{max}^{MeOH}$ 238 m$\mu$($\epsilon$23,900); infrared: $\lambda_{max}^{Nujol}$
3410 cm.$^{-1}$, 1714 cm.$^{-1}$, 1678 cm.$^{-1}$, 1630 cm.$^{-1}$
1592 cm.$^{-1}$, 1082 cm.$^{-1}$ The $\Delta^{4,16}$-pregnadiene-21-ol,3,11,20-trione (0.91 g.) was dissolved in 400 ml. of benzene containing 1.4 ml. of pyridine, and 1.0 g. of osmium tetroxide was added. The mixture was allowed to stand at room temperature for 5 days. The osmate ester was then discharged with a mixture of 68 ml. of water, 20 ml. of methanol, 7.2 g. of sodium sulfite and 7.2 g. of potassium bicarbonate. After stirring for 6 hours, 200 ml. of chloroform was added, and the precipitate was filtered off and washed with two liters of hot chloroform. The combined filtrates were washed 3 times with saturated saline solution, dried over sodium sulfate and evaporated to dryness under reduced pressure. Crystallization from acetone gave 0.50 g. (50%) of $\Delta^4$-pregnene-16$\alpha$,17$\alpha$,21-triol-3,11,20-trione, melting point 233°–234° C. Recrystallization from methanol-acetone raised the melting point to 238°–240° C., $[\alpha]_D^{24}$ +153° (methanol);

ultraviolet: $\lambda_{max}^{EtOH}$ 237–238 m$\mu$($\epsilon$16,500)

infrared: $\lambda_{max}^{KBr}$ 3380 cm.$^{-1}$, 1736 cm.$^{-1}$, 1720 cm.$^{-1}$
1657 cm.$^{-1}$, 1620 cm.$^{-1}$, 1108 cm.$^{-1}$, 1074 cm.$^{-1}$, 1062 cm.$^{-1}$ A mixture of 100 mg. of $\Delta^4$-pregnene-16$\alpha$,17$\alpha$,21-triol-3,11,20-trione, 5 ml. of pyridine and 2 ml. of acetic anhydride was allowed to stand at room temperature for 16 hours after which it was poured into ice water. The solution was extracted with 250 ml. of chloroform, and the extract was washed 3 times with saturated saline solution, dried over magnesium sulfate and evaporated under reduced pressure. The resultant crystalline material solvated badly with polar solvents, and crystallization was accomplished by forcing the crystals out of acetone with petroleum ether. The yield of $\Delta^4$-pregnene-16$\alpha$,17$\alpha$,21-triol-3,11,20-trione 16,21-diacetate was 70 mg. (57%), melting point 224°–227° C. Further recrystallization did not change the melting point; $[\alpha]_D^{24}$ +129° (chloroform);

ultraviolet: $\lambda_{max}^{EtOH}$ 237–238 m$\mu$($\epsilon$16,400)

infrared: $\lambda_{max}^{KBr}$ 3450 cm.$^{-1}$, 1752 cm.$^{-1}$, 1730 cm.$^{-1}$
1714 cm.$^{-1}$, 1670 cm.$^{-1}$, 1630 cm.$^{-1}$, 1245 cm.$^{-1}$, 1076 cm.$^{-1}$

*Example 6*

Reichstein's Substance S 21-acetate bisethylene ketal (0.5 g.) was dissolved in 10 ml. of anhydrous pyridine, chilled to −5° C. and 2 ml. of purified thionyl chloride added. The mixture was allowed to stand at −5° C. for 16 hours, then at room temperature for one hour. Finally it was rechilled to −5° C. and poured into ice water. The oily mixture was extracted with 250 ml. of ether, the organic layer was washed three times with saturated saline solution and was dried over anhydrous sodium sulfate. The extract was evaporated to dryness under reduced pressure. Crystallization of the oily residue from methanol yielded 0.16 g. (33%) of $\Delta^{5,16}$-pregnadiene-21-ol-3,20-dione 21-acetate 3,20-bisethylene ketal, melting point 126°–129.5° C. Recrystallization from acetone-methanol raised the melting point to 131°–132° C., $[\alpha]_D^{25}$ −34° (chloroform);

ultraviolet: $\lambda_{max}^{EtOH}$ none; infrared: $\lambda_{max}^{Nujol}$ 1738 cm.$^{-1}$
1630 cm.$^{-1}$, 1226 cm.$^{-1}$, 1088 cm.$^{-1}$ The $\Delta^{5,16}$-pregnadiene-21-ol-3,20-dione 21-acetate 3,20-bisethylene ketal (60 mg.) was refluxed for one-half hour on a steam-bath with 10 ml. of two and one-half percent alcoholic potassium hydroxide. The addition of water yielded 50 mg. (92%) of $\Delta^{5,16}$-pregnadiene-21-ol-3,20-dione 3,20-bisethylene ketal, melting point 192°–210° C. Recrystallization from acetone-petroleum ether gave white crystals, melting point 191°–194° C., $[\alpha]_D^{24}$ −46° (chloroform);

ultraviolet: $\lambda_{max}^{EtOH}$ none; infrared: $\lambda_{max}^{Nujol}$
3570 cm.$^{-1}$, 1630 cm.$^{-1}$, 1095 cm.$^{-1}$ The $\Delta^{5,16}$-pregnadiene-21-ol-3,20-dione 3,20-bisethylene ketal (450 mg.) was refluxed for one hour on a steam-bath with 6 ml. of 8% (v./v.) sulfuric acid in 100 ml. of methanol. Water was added and the methanol evaporated off under reduced pressure. The mixture was extracted with 500 ml. chloroform, the organic layer washed with 2% sodium bicarbonated solution followed by saturated saline solution and dried over anhydrous sodium sulfate. The extract was evaporated to dryness under reduced pressure, and the residue crystallized from acetone-petroleum ether. The yield was 260 mg. (74%) of $\Delta^{4,16}$-pregnadiene-21-ol-3,20-dione, melting point 227°–232° C. Recrystallization from acetone-petroleum ether raised the melting point to 229°–232° C. This compound gave a positive $\alpha$-ketol test and a positive Porter-Silber test, $[\alpha]_D^{24}$ +148° C. (chloroform);

ultraviolet: $\lambda_{max}^{EtOH}$ 240–241 m$\mu$($\epsilon$23,600); infrared: $\lambda_{max}^{KBr}$
3472 cm.$^{-1}$, 1672 cm.$^{-1}$, 1666 cm.$^{-1}$
1622 cm.$^{-1}$, 1592 cm.$^{-1}$, 1090 cm.$^{-1}$ The $\Delta^{4,16}$-pregnadiene-21-ol-3,20-dione (1.6 g.) was allowed to stand overnight at room-temperature with 40 ml. of pyridine and 15 ml. of acetic anhydride. The solvents were then evaporated off under reduced pressure, and the residue crystallized with ether. The yield of $\Delta^{4,16}$-pregnadiene-21-ol-3,20-dione 21-acetate was 1.72 g. (95%), melting point 125°–127° C. Recrystallization raised the melting point to 153°–154° C., $[\alpha]_D^{25}$ +142° (chloroform);

ultraviolet: $\lambda_{max}^{EtOH}$ 238–241 m$\mu$($\epsilon$24,200)

The $\Delta^{4,16}$-pregnadiene-21-ol-3,20-dione 21-acetate (0.6 g.) was dissolved in 20 ml. of benzene containing 0.6 ml. of pyridine and 0.45 g. osmium tetroxide added. After standing at room-temperature for 5 days the osmate ester was discharged with 34 ml. of water, 20 ml. of benzene, 20 ml. of methanol, 3.6 g. of sodium sulfite and 3.6 g. of potassium bicarbonate. The mixture was stirred for 5 hours and then 100 ml. of chloroform added. The brown precipitate was filtered off and washed with 200 ml. of hot chloroform. The combined filtrates were washed 3 times with saturated saline solution, dried over anhydrous sodium sulfate. The extract was then evaporated to dryness under reduced pressure and the solid residue crystallized from acetone-petroleum ether. The yield of $\Delta^4$-pregnene-16$\alpha$,17$\alpha$,21-triol-3,20-dione 21-acetate was 472 g. (72%), melting point 206°–210° C., $[\alpha]_D^{25}$ +105° (chloroform);

ultraviolet: $\lambda_{max}^{EtOH}$ 240.5 m$\mu$($\epsilon$17,500)

The $\Delta^4$-pregnene-16$\alpha$,17$\alpha$,21-triol-3,20-dione 21-acetate (100 mg.) was dissolved in 20 ml. of anhydrous methanol and agitated for 10 minutes at room-temperature under a nitrogen atmosphere with a solution of 7 mg. of metallic sodium in 10 ml. of methanol. The solution was then neutralized with 0.1 ml. of glacial acetic acid and most of the methanol evaporated off under reduced pressure. Hot water was then added and the solution cooled. The crystals were filtered off, and washed with water. The yield of Δ⁴-pregnene-16α,17α,21-triol-3,20-dione was 54 mg. (60%), melting point 225°–227° C. Recrystallization from methanol-ether raised the melting point to 238°–240° C., $[\alpha]_D^{24}$ +93° (methanol);

ultraviolet: $\lambda_{max}^{EtOH}$ 240 m$\mu$($\epsilon$17,100); infrared: $\lambda_{max}^{KBr}$ 3450 cm.⁻¹, 1722 cm.⁻¹, 1680 cm.⁻¹, 1622 cm.⁻¹ 1080 cm.⁻¹

*Example 7*

The mother liquors from the crystallization of Δ⁴-pregnene-16α,17α,21-triol-3,20-dione 21-acetate were evaporated to dryness under reduced pressure, and 6 ml. of pyridine and 3 ml. of acetic anhydride were added. The mixture was allowed to stand overnight at room-temperature, and then poured into cold water. The crystalline product was filtered off, and washed with water. The yield was 41 mg. of Δ⁴-pregnene-16α,17α,21-triol-3,20-dione 16,21-diacetate, melting point 202°–204° C. Recrystallization from acetone-petroleum ether raised the melting point to 205°–206° C., $[\alpha]_D^{25}$ +51° (chloroform);

ultraviolet: $\lambda_{max}^{EtOH}$ 240 m$\mu$($\epsilon$16,800); infrared: $\lambda_{max}^{KBr}$ 3512 cm.⁻¹, 1750 cm.⁻¹, 1732 cm.⁻¹ (shoulder), 1678 cm.⁻¹ 1622 cm.⁻¹ 1236 cm.⁻¹, 1062 cm.⁻¹

*Example 8*

The Δ⁵,¹⁶-pregnadiene-21-ol-3,20-dione 21-acetate 3,20-bisethylene ketal (1.75 g.) was dissolved in 50 ml. of benzene containing 1.2 ml. of pyridine, and 1.0 g. of osmium tetroxide added. The reaction mixture was allowed to stand at room-temperature for 7 days. The osmate ester was discharged with 68 ml. of water, 35 ml. of methanol, 40 ml. of benzene, 7.2 g. of sodium sulfite and 7.2 g. of potassium bicarbonate and allowed to stir for 8 hours. Two hundred ml. of chloroform was then added, and the precipitate was filtered off and washed with one and one-half liters of hot chloroform. The chloroform extract was then washed 3 times with saturated saline solution, dried over sodium sulfate and evaporated to dryness under reduced pressure. The residue was slurried with warm ether and filtered, yielding 1.23 g. (65%) of Δ⁵-pregnene-16α,17α,21-triol-3,20-dione 21-acetate 3,20-bisethylene ketal, melting point 228°–229° C. The compound solvated with acetone and methanol, and was consequently purified by slurrying with warm ether, melting point 231°–233° C., $[\alpha]_D^{25}$ —66° (chloroform);

ultraviolet: $\lambda_{max}^{EtOH}$ none; infrared: $\lambda_{max}^{KBr}$ 3554 cm.⁻¹ 3500 cm.⁻¹, 1252 cm.⁻¹, 1108 cm.⁻¹, 1042 cm.⁻¹

The mother liquor from the crystallization of Δ⁵-pregnene-16α,17α,21-triol-3,20-dione 21-acetate 3,20-bisethyene ketal was dissolved in 20 ml. of 2% alcoholic potassium hydroxide and refluxed for one-half hour. The mixture was then cooled, and water was added. Crystals which separated were filtered off and washed with water. The yield of Δ⁵-pregnene-16α,17α,21-triol-3,20-dione 3,20-bisethylene ketal was 450 mg., melting point 254°–257° C. Recrystallization from acetone raised the melting point to 271°–273° C. melting point was dependent on the rate of heating), $[\alpha]_D^{25}$ —34° (pyridine);

ultraviolet: $\lambda_{max}^{EtOH}$ none; infrared: $\lambda_{max}^{KBr}$ 3500 cm.⁻¹ 3360 cm.⁻¹, 1100 cm.⁻¹, 1052 cm.⁻¹

The Δ⁵-pregnene-16α,17α,21-triol-3,20-dione 3,20-bisethylene ketal (260 mg.) was dissolved in 25 ml. of methanol containing 2 ml. of 8% (v./v.) sulfuric acid and was refluxed for 40 minutes. The mixture was cooled, neutralized with sodium bicarbonate, and water was added. The crystalline material was filtered off, washed with water and dried. The yield of Δ⁴-pregnene-16α,17α,21-triol-3,20-dione was 0.17 g. (81%), melting point 229°–231° C. Recrystallization from methanol-ether raised the melting point to 238°–240° C.

We claim:

1. Compounds of the group having the general formula:

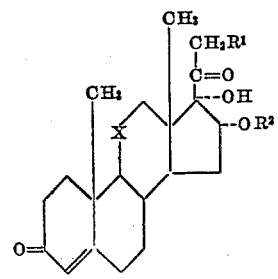

in which X is a divalent radical of the group consisting of

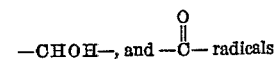

R¹ is a member of the group consisting of hydroxyl and lower alkanoyloxy radicals, and R² is a member of the group consisting of hydrogen and lower alkanoyl radicals.

2. Compounds in accordance with claim 1 in which X is a —CHOH— radical, R¹ is a lower alkanoyloxy radical and R² is a lower alkanoyl radical.

3. Δ⁴-Pregnene-11β,16α,17α,21-tetrol-3,20-dione.

4. Δ⁴-Pregnene-16α,17α,21-triol-3,11,20-trione.

5. Δ⁴-Pregnene - 11β,16α,17α,21 - tetrol - 3,20 - dione-21-acetate.

6. Δ⁴ - Pregnene - 11β,16α,17α,21 - tetrol - 3,20 - dione-16,21-diacetate.

7. Δ⁴ - Pregnene - 16α,17α,21 - triol - 3,11,20 - trione-16,21-diacetate.

8. A method of preparing compounds having the general formula:

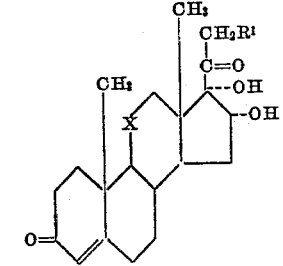

in which X is a divalent radical of the group consisting of

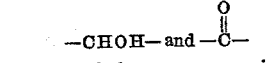

and R¹ is a member of the group consisting of hydroxyl and lower alkanoyloxy radicals which comprises mixing together under reactive conditions a compound having the formula:

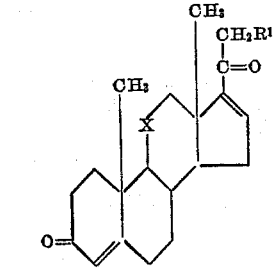

in which X and R¹ are as defined above and osmium tetroxide in the presence of an aromatic hydrocarbon solvent and a tertiary amine.

9. A method of preparing Δ⁴-pregnene-11β,16α,17α-21-tetrol-3,20-dione 21-lower alkanoate which comprises mixing together under reactive conditions Δ⁴,¹⁶ pregnadiene-11β,21-diol-3,20-dione 21-lower alkanoate with osmium tetroxide in the presence of an aromatic hydrocarbon solvent and pyridine and recovering said compound therefrom.

10. A method of preparing a Δ⁴-pregnene-11β,16α,17α-triol-3,20-dione 21-acetate which comprises reacting a Δ⁴,¹⁶-pregnadiene-11β,21-diol-3,20-dione 21-acetate with osmium tetroxide in the presence of an aromatic hydrocarbon solvent and a tertiary amine.

11. A method of preparing Δ⁴-pregnene-16α,17α,21-triol-3,11,20-trione which comprises mixing together under reactive conditions Δ⁴,¹⁶-pregnadiene-21-ol-3,11,20-trione with osmium tetroxide in the presence of an aromatic hydrocarbon solvent and pyridine and recovering said compound therefrom.

12. A method of preparing Δ⁴-pregnene-11β,16α,17α-21-tetrol-3,20-dione 21-acetate which comprises mixing together under reactive conditions Δ⁴,¹⁶-pregnadiene-11β,21-diol-3,20-dione 21-acetate with osmium tetroxide in the presence of an aromatic hydrocarbon solvent and pyridine and recovering said compound therefrom.

13. A method of preparing Δ⁴-pregnene-11β,16α,17α,21-tetrol-3,20-dione which comprises mixing together under reactive conditions Δ⁴,¹⁶-pregnadiene-11β,21-diol-3,20-dione 21-acetate with osmium tetroxide in the presence of an aromatic hydrocarbon solvent and pyridine and recovering said compound therefrom.

References Cited in the file of this patent

UNITED STATES PATENTS

| | | |
|---|---|---|
| 2,265,143 | Butenandt | Dec. 9, 1941 |
| 2,602,804 | Kendall | July 8, 1952 |
| 2,666,770 | Wall | Jan. 19, 1954 |
| 2,683,712 | Hogg | July 13, 1954 |
| 2,684,364 | Jones | July 20, 1954 |